US009430445B2

(12) United States Patent
Hu et al.

(10) Patent No.: US 9,430,445 B2
(45) Date of Patent: Aug. 30, 2016

(54) DOCUMENT EDITOR AND METHOD FOR EDITING DOCUMENT

(75) Inventors: Xiao Wei Hu, Beijing (CN); Yu Hang Gao, Beijing (CN); Wei Guo Shi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1971 days.

(21) Appl. No.: 11/289,251

(22) Filed: Nov. 29, 2005

(65) Prior Publication Data

US 2006/0117249 A1 Jun. 1, 2006

(30) Foreign Application Priority Data

Nov. 29, 2004 (CN) .......................... 2004 1 0095532

(51) Int. Cl.
| | |
|---|---|
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |

(52) U.S. Cl.
CPC ..................................... *G06F 17/21* (2013.01)

(58) Field of Classification Search
USPC .......................... 715/255, 273, 201, 234, 210
See application file for complete search history.

(56) References Cited

U.S. PATENT DOCUMENTS

| | | | |
|---|---|---|---|
| 5,911,145 A | 6/1999 | Arora et al. | |
| 5,974,444 A | 10/1999 | Konrad | |
| 6,253,204 B1 * | 6/2001 | Glass et al. | 715/205 |
| 6,405,225 B1 * | 6/2002 | Apfel et al. | 715/210 |
| 6,507,845 B1 * | 1/2003 | Cohen et al. | 707/608 |
| 6,542,166 B1 | 4/2003 | Washington et al. | |
| 6,574,644 B2 | 6/2003 | Hsu et al. | |
| 6,585,776 B1 * | 7/2003 | Bates et al. | 715/206 |
| 6,717,595 B1 | 4/2004 | Yennaco | |
| 6,895,588 B1 * | 5/2005 | Ruberg | 719/321 |
| 7,360,164 B2 * | 4/2008 | Bjoernsen et al. | 715/751 |
| 7,401,287 B2 * | 7/2008 | Suzuki | 715/208 |
| 7,415,716 B2 * | 8/2008 | Marin et al. | 719/330 |
| 7,444,587 B1 * | 10/2008 | Michail et al. | 715/255 |

(Continued)

OTHER PUBLICATIONS

Reisner, Trudi Using Corel WordPerfect Special Edition, Aug. 1999, Que Corporation, p. 105 and 328.*

*Primary Examiner* — Manglesh M Patel
*Assistant Examiner* — Nicholas Hasty
(74) *Attorney, Agent, or Firm* — Brevetto Law Group

(57) ABSTRACT

The present invention provides a document editor and a method for editing document to facilitate the collaboration between users. The document editor comprises a user interface for editing and displaying document information; a dispatcher for identifying objects in the user interface and their identifiers according to object definition, and providing the object information to the user interface; and at least one connector, for communicating with remote or local service using the identifier and address of at least one of the objects, to exchange the object information with the remote or local service and transfer the information to the dispatcher. According to the document editor and the method for editing document, a user could obtain more information of the object embedded in the document and effectively avoid operation failure on the object.

21 Claims, 1 Drawing Sheet

(56) References Cited

U.S. PATENT DOCUMENTS

| | | |
|---|---|---|
| 2002/0065848 A1 | 5/2002 | Walker et al. |
| 2002/0152244 A1* | 10/2002 | Dean et al. .................. 707/530 |
| 2002/0161777 A1 | 10/2002 | Smialek et al. |
| 2003/0070006 A1* | 4/2003 | Nadler et al. ................. 709/330 |
| 2003/0135507 A1 | 7/2003 | Hind et al. |
| 2003/0226111 A1 | 12/2003 | Wirts et al. |
| 2004/0015858 A1 | 1/2004 | Seto et al. |
| 2005/0187914 A1* | 8/2005 | Fujita et al. ..................... 707/3 |

* cited by examiner

DOCUMENT EDITOR AND METHOD FOR EDITING DOCUMENT

TECHNICAL FIELD

The present invention relates to techniques for editing document, more particularly relates to a document editor and method for editing document in collaboration environments.

BACKGROUND

There are lots of link to remote objects embedded in documents for current editors, for example, URL link, Mail address link, document link. Current editors can display the link information but not the status of the remote object. When the editor user invokes another tool to operate on the link (open URL, send a mail, initiate a chat . . . ) the operations often fail because the remote object is not in proper states or lost at all. There are also other text strings in the document representing some objects, e.g. a social event, an address, a flight, etc., locating on some servers in the network.

It would be very helpful for the user to know the status and other metadata of the above remote object. The user can decide proper operation upon the object based on the status and other metadata of the object to reduce the probability of operation failure and effort wasting.

Currently most of the time, the user has to invoke another application for specific operation, and then input the name and other information of the object. So the user has to be very familiar with the tools on his/her machine to make use of them. Sometimes, there are some function is only rarely used, but users has to be familiar with these functions. This is inconvenient to users.

Microsoft OLE technology provides a method to update the embedded objects (not the link). This technology embeds the contents of the object to be processed in the current document. Obviously, the method needs a lot of system resource, and can not just display the updated metadata or status of the object dynamically.

U.S. Pat. No. 6,585,776 discloses an editor wherein links can be displayed. The editor could not provide useful information if the remote objects associated with the links are actually canceled or not exist.

SUMMARY OF THE INVENTION

In order to overcome the shortcoming of the prior arts, one object of the present invention is to provide an editor and an editing method to facilitate the collaboration between users.

According to one aspect of the present invention, a document editor is provided. The document editor comprises a user interface for editing and displaying document information; a dispatcher for identifying objects and their identifiers and addresses in the user interface according to object definition, and providing the object information to the user interface; and at least one connector, for communicating with a remote or local service using the identifier and address of at least one of the objects, to exchange the object information with the remote or local service and transfer the information to the dispatcher.

According to another aspect of the present invention, a method for editing document is provided. The method comprises opening or creating a document in a user interface of an editor; identifying objects in the document and their identifiers and addresses according to object definition; communicating with a remote or local service using the identifier and address of at lease one of the objects to exchange the object information with the remote or local service; and providing the object information to the user interface According to the present invention, the document editor and the method for editing document could display object links in a document being edited, and display the status, the metadata and other information of the remote objects associated with the object links. According to the present invention, the metadata and the content of the remote objects could be updated in real time, and there is no need to open the objects with special applications. The present invention also provides an open framework to provide the capability for the editor to display the information of a new type of object.

The editor according to the present invention could identify object links in a document being edited. The editor exchanges the metadata of the object links with remote or local services. The editor displays the changes of some particular objects and their metadata with various formats. The editor might update the information of objects with predefined intervals.

According to the present invention, the editor and editing method will enable the user to know more about the information of the objects embedded in the document. This will effectively avoid operation failure upon particular objects.

The present invention collects object information from remote services for the editor with a local service. This reduces overhead for obtaining information for the editor from remote services. The information is shared among tools.

DETAILED DESCRIPTION OF EMBODIMENTS

Figure 1:
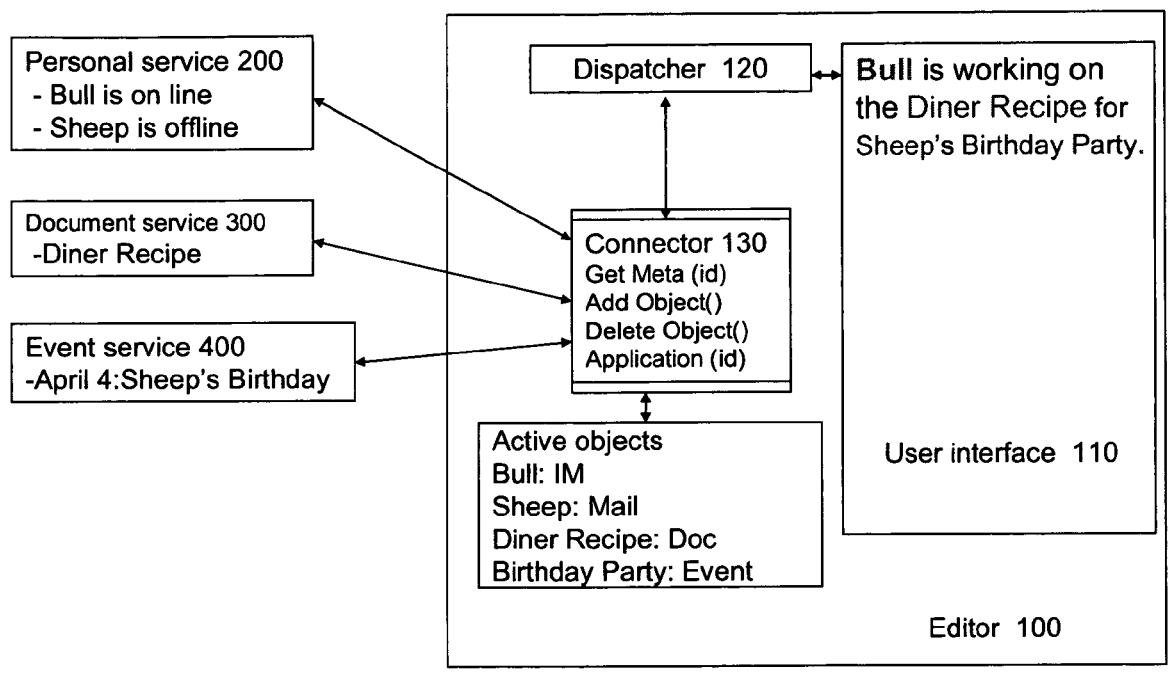
FIG. 1 illustrates a document editor according to one embodiment of the present invention.

FIG. 1 illustrates a document editor according to one embodiment of the present invention. Wherein, the document editor 100 comprises a user interface 110, a dispatcher 120 and a plurality of connectors 130. The user interface 110 is used for editing and displaying document information, e.g. the document content being edited by a user shown in the FIGURE "Bull is working on the Diner Recipe for Sheep's Birthday Party." The dispatcher 120 identifies objects (or object links) and their identifiers and addresses in the user interface according to object definition (or object link definition), and providing the object information to the user interface. There are several objects in the document, e.g. Bulls Diner Recipes Sheep and Sheep's Birthday Party. The dispatcher 120 identifies these objects according to predefined object definition, and identifies the identifiers and addresses of these objects. The identifiers and addresses herein and after refer to the object identifiers in remote services or local services, and the addresses of the services respectively. It could be understood that the object identifier in a remote service could be same to or different from the identifier or label displayed in the current document in the editor. The connectors 130 are for communicating with remote or local services using the identifiers and addresses of the objects, to exchange the object information with the remote or local services and transfer the information to the dispatcher.

Of the objects in the document shown in FIG. 1, Bull and Sheep are people name objects; Diner Recipe is a document object; Sheep's Birthday Party is an event object. There is a people name object in the event object Sheep's Birthday Party. According to object definition, the dispatcher 120 identifies the identifiers and addresses of these objects, and further identifies the types of these objects. The object definition could be stored in the editor beforehand, or stored in the computer or network where the editor exists. The dispatcher 120 identifies the object Sheep's Birthday Party, and might further identifies other objects embedded in the object, e.g. the people name object Sheep in the object.

Then, the dispatcher 120 transfers the identified identifiers and addresses of the objects to service connectors 130. The service connectors 130 use the identifiers and addresses of the objects to communicate with remote or local services and exchange objects information. The service connectors 130 transfer the information to the dispatcher. Wherein, a connector 130 uses the identifiers and addresses of Bull and Sheep to communicate with a personal service and exchange the metadata and/or content information of Bull and Sheep; a connector 130 uses the identifier and address of Diner Recipe to communicate with document service 300 and exchange information of Diner Recipe. The document object, its metadata and content in document service 300 might also be added, amended or canceled. A connector 130 uses the identifier and address of Sheep's Birthday Party to communicate with event service 400 and exchange information of the event. According to the present invention, selection of corresponding connector might be (but not must) based on the object type. If only part of the object information needs to be exchanged, the part could be designated when the object is created in the editor, or the part could be designated by selecting the object in the user interface. One or more kinds of object information might be specified.

The service connectors obtain the required objects information, and transfer the information to the dispatcher 120. The dispatcher 120 provides the information to the user interface. The information of the object could be displayed in the user interface together with the object. As an alternative, user might decide whether the information will be displayed or not after selecting an object. For example, a user selects an object with a mouse and clicks the auxiliary button (usually the right button for right-handed person) of the mouse on the object, the object information is shown in a pull down menu.

The connectors 130 could periodically communicate with remote services to update the object information. The connectors could also update the object information according to the notification of remote services. After the information being updated, the user might be notified with special format in the user interface of the editor. The change of object status or metadata will be displayed with special effect in the user interface.

In the present invention, the connectors exchanging object information with the services means that the connectors might obtain object information from the services, and also might (but not must) transfer the information of local objects to the services.

The services in the present invention comprise but not limited to object services implemented in computing apparatus and servers, service systems or service apparatus.

In the present invention, the definition of an object comprises one or more selected from the following: the type of the object, the label or identifier in a document, address of the remote or local service corresponding to the object, the identifier of the object in the service, and the metadata or content of the object to be displayed in the editor.

Wherein, the information of the object (or object information) comprises one or more selected from the following: the status of the object, the metadata of the object, the expiration time of the object, the content of the object, and service addresses providing service associated with the object.

According to the present invention, a user might add definition of a new object via predefined user interface to increase the object types that the editor could process.

According to one aspect of the present invention, the editor comprises a plurality of connectors corresponding to a plurality of object types; the dispatcher is further configured to identify object type, and invoke corresponding connector to communicate with remote service and exchange the status, metadata and/or content of the object. The dispatcher identifies object links in the document being edited. The dispatcher communicates with different connectors to exchange the status, metadata and/or content of an object, or register with remote service an object and/or its status, metadata and/or content. The object in the document in the editor is active object, and its identifier and information are cached in the editor. When the object is displayed in the editor window, the object status could be displayed together without querying remote service.

When the editor open a document embedded with an object (or object link) or create a new object (or object link), the dispatcher identifies the identifier and address of the object according to predefined object (or object link). The object (or object link) definition usually comprises the type of the object, the label in a document, remote/local service address corresponding to the object, and the object identifier (ID) in the service. The object (or object link) might also comprise the object metadata to be stored or displayed in the editor. The document could embed a particular object at different places, but different metadata and content might be designated to be displayed at different places. In user interface, one or more of the object, object content, status and metadata and their changed could be displayed with special effects.

The object according to the present invention might, but not limited to, be defined with the following method. A sample object link definition is as following in which the object link is represented by a field definition.

field_type:protocol:object_id@server address:meta attribute, default_value:label string The meaning of every part:

field_type: type of the field protocol: protocol for communication to the service associated with the object object_id@server: remote service name and the object identifier in the remote service address: the address of remote/local service meta attribute, default_value label string If the editor could not process a type of object, the editor will only display the label string of the object.

An example link follow above definition is as following.

Location:SIP:confroom_1@cn.ibm.com:status "not known":"conf room"

In the above example object link, the "Location" represents the type of the object is a location object, the "SIP" represents the protocol used to interact with a remote service to exchange the information of the object. The "confroom_1" is the object id. The confroom 1@cn.ibm.com represents remote service name, address and the object identifier in the remote service. The "status" represent the document only interested in the status of the location. The "not known" represents the default content of the "status" metadata. The label of "conf room" is for the editor to display if the service corresponding to the object is not available. Thus, the editor user will know required information in time and collaboration effectiveness is improved.

According to the present invention, after the dispatcher of the editor identifies the object and its type, the editor will check whether it can process the object of the type and whether it has corresponding connector for communicating with remote service. If the editor cannot process the object, the editor will treat the object as plain text for displaying and will not display objects embedded in the object. The position where metadata and content are to be displayed can display some place holders that indicate the object is not available.

If remote service become unavailable from available, or the object content is stored in the editor and could not be updated, the editor can also display data stored in the document with special format to indicate the data is not current information or such information require updating.

If the editor is able to process one type of object and has a connector corresponding to the object, it will load corresponding connector and exchange status, metadata and/or content of the object with remote server. The editor stores the object as active object, stores its information. Then, the editor displays the label of the object in proper effects (e.g. in certain color) to show the object information is available. When the object is selected by a user in the editor window, user can invoke metadata and other operations available for the particular objects. After processing the object, its processed information might be updated to the remote service with a connector.

The stored object information discussed above could be temporarily stored in the dispatcher, or be permanently stored in the document.

The dispatcher will periodically, or as instructed by a user, update the metadata and other information of the active objects with connectors. When there are some changes the dispatcher can update the display of the object.

The editor can also work with a computing platform which has multiple applications (e.g. Chat tools, Email tools, Calendars tools) for collaboration on the objects. The editor can query what tool is available for specific types of objects or a specific object. Then show the available information to the user. When the user selects a tool or an operation, the editor can invoke a corresponding application on specific object through the computing platform.

A person skilled in the art can understand that one or more of the following could be predefined: the objects in the present invention, or the types of the object, their corresponding remote service location and the object location in the remote service. Communication with remote services could be implemented with various addressing method known in the field.

The invention claimed is:

1. A document editor configured to display status and metadata for an object embedded in a document, the document editor comprising:
    a dispatcher for identifying the object, an identifier of the object, and an address of a remote service implemented in a computing apparatus and corresponding to the object in a user interface according to an object definition, and for providing object information to the user interface, wherein the object information includes the status and the metadata;
    the user interface for editing and displaying document information, wherein the user interface displays the status and the metadata of the object together with an object link, at least one of the status and the metadata being displayed with a special effect indicating a change detected in the status or the metadata of the object; and
    at least one connector for communicating with the remote service using the identifier and the address and for exchanging the status and the metadata with the remote service, and for transferring the status and the metadata to the dispatcher;
    the document editor being configured to determine whether the remote service is available or unavailable;
    wherein the user interface is configured to display the object as plain text if said document editor determines the remote service to be unavailable;
    wherein said at least one connector periodically communicates with the remote service to exchange the object information, the special effect indicating the change detected since a previous periodic communication between said at least one connector and the remote service.

2. The document editor of claim 1, wherein the object definition comprises one or more of the following: an object type, a label for display in a document, the address of the remote service corresponding to the object, the identifier of the object, the metadata, and a specified content of the object to be displayed in the document editor.

3. The document editor of claim 1, further comprising a plurality of connectors corresponding to a plurality of object types, wherein the dispatcher is further configured for identifying an object type and for invoking a corresponding connector according to the object type.

4. The document editor of claim 1, wherein the object information further comprises one or more of the following: an expiration time of the object, a content of the object, and the address.

5. The document editor of claim 1, wherein the dispatcher stores the object information, and the connector updates the object information according to information in the remote service.

6. The document editor of claim 1, wherein the connector updates the object information according to a notification of the remote service.

7. The document editor of claim 1,
    wherein the user interface is configured to display an object label with an indication of availability of the object information;
    wherein the special effect is a first color indicating the change detected, and wherein the user interface displays the object label in a second color as an indication of the availability of the object information.

8. The document editor of claim 1, wherein the document editor is further configured to add a definition of a new object via predefined standard interface to expand editor capability for processing objects.

9. The document editor of claim 1, wherein the dispatcher, upon identifying the object and before embedding the object, is configured to check whether the editor can process the object and whether the editor has a corresponding connector for communicating with the remote service.

10. The document editor of claim 1, further comprising:
    a display device configured to display an editor window; and a mouse configured to select the object being displayed the editor window, and invoke the status and the metadata of said object.

11. A method for editing a document to display status and metadata for an object embedded in the document, the method comprising:
opening the document in a user interface of an editor;
identifying the object embedded in the document, an identifier of the object, and an address of a remote service corresponding to the object according to an object definition;
communicating with the remote service using the identifier and the address to exchange object information with the remote service, wherein the object information includes the status and the metadata;
providing the object information to the user interface; and
displaying the status and the metadata of the object together with the object in the user interface, at least one of the status and the metadata being displayed with a special effect indicating a change detected in the status or the metadata of the object;
determining whether the remote service is available or unavailable;
wherein the user interface is configured to display the object as plain text if said document editor determines the remote service to be unavailable;
wherein the object information is exchanged by periodically communicating with the remote service, the special effect indicating the change detected since a previous periodic communication with the remote service.

12. The method of claim 11, wherein the object definition comprises one or more of the following: an object type, a label for display in the document, the address of the remote service corresponding to the object, the identifier, the metadata, and specified content of the object to be displayed in the editor.

13. The method of claim 11, wherein the identifying further comprises identifying a type of the object; wherein the communicating is implemented by invoking a corresponding connector according to the object type and exchanging the object information with the remote service using the identifier and the address.

14. The method of claim 11, wherein the object information comprises one or more of the following: the status, the metadata, an expiration time of the object, a content of the object, and the address.

15. The method of claim 11 further comprising:
storing the object information; and
updating the object information according to information in the remote service.

16. The method of claim 11, wherein the object information is updated according to a notification of the remote service.

17. The method of claim 11, wherein the special effect is a first color indicating the change detected, the method further comprising:
wherein the user interface is configured to display an object label with an indication of availability of the object information;
displaying the object label in a second color as an indication of the availability of the object information.

18. The method of claim 11 further comprising:
adding a definition of a new object via a predefined standard interface to expand editor capability for processing objects.

19. The method of claim 11, further comprising:
creating the document in the user interface of the editor.

20. The method of claim 11, further comprising:
checking whether the editor can process the object and whether the editor has a corresponding connector for communicating with the remote service, said checking being performed in response to identifying the object and before embedding the object.

21. The method of claim 11, further comprising:
displaying an editor window on a display device; and
receiving an input to select the object being displayed the editor window, and invoking the status and the metadata of said object.

* * * * *